Sept. 21, 1937.　　　　J. LE VALLEY　　　2,093,681
CONNECTING ROD
Filed July 11, 1934

INVENTOR.
John LeValley.
BY
HIS ATTORNEY.

Patented Sept. 21, 1937

2,093,681

UNITED STATES PATENT OFFICE 2,093,681

CONNECTING ROD

John Le Valley, Painted Post, N. Y., assignor to Ingersoll-Rand Company, Jersey City, N. J., a corporation of New Jersey Application July 11, 1934, Serial No. 734,582

7 Claims. (Cl. 308—68)

One object of the invention is to provide a connecting rod in which the bearing elements may be assembled with a minimum of labor and a maximum of efficiency, and in which the use of shims, as that word is commonly used to define extremely thin pieces of metal, may be entirely eliminated. A connecting rod is commonly employed in pumps, internal combustion engines and the like to transform the rotary motion of one element, usually a crank shaft, to a reciprocating motion of another element, usually a piston. Thus it must be connected at each end to an element having different motions. Relative to each of these elements the connecting rod itself will have an oscillating motion and will perform a thrusting function. It is essential in the thrusting function that the connecting rod be tightly connected to both the driving and driven elements to avoid play in the connection with the attendant lost motion and knocking which eventually result in fatigue of the parts. It is well known, however, that a connection which is too tight will set up heavy friction in the oscillating movement which increases the difficulties of lubrication, generates heat and results in loss of power and damage to the bearings. Consequently the fitting of the bearing surfaces to the wrist pins and crank pins of an engine or the like is a comparatively delicate operation as a compromise between the tight fit desired for maximum thrusting efficiency and the loose fit desired for maximum oscillating efficiency must be reached.

This invention contemplates substituting for the shim elements commonly employed a spacing element of incompressible metal which can be quickly and positively adjusted to give complete freedom of oscillating movement with practically zero play in the thrusting function.

Figure 1:
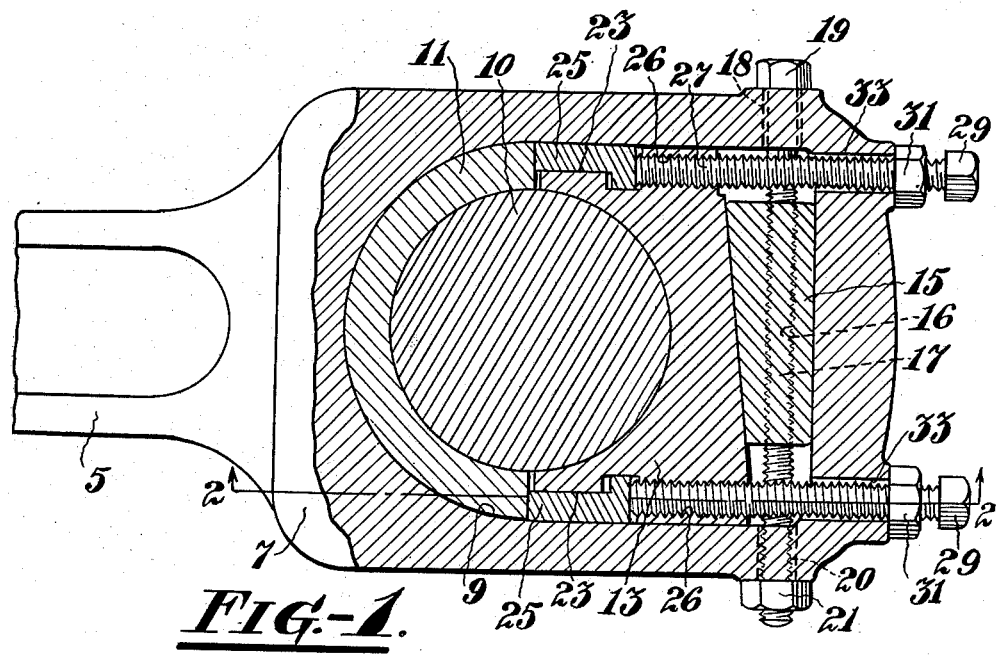
Figure 2:
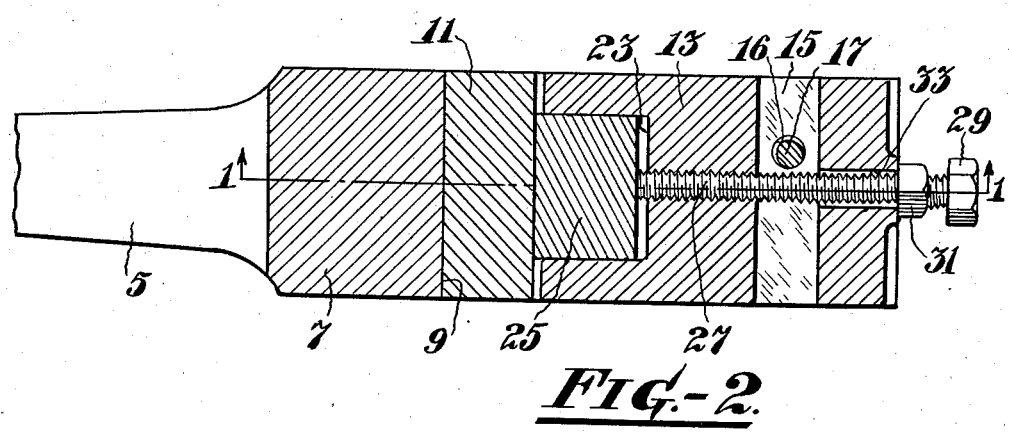

In the accompanying drawing, Fig. 1 illustrates the crank end of a connecting rod partly broken away on the line 1—1 of Fig. 2 looking in the direction of the arrows to illustrate a practical embodiment of the invention, and Fig. 2 is a view partly in section taken at right angles to Fig. 1 on the line 2—2 looking in the direction of the arrows.

In the drawing, a connecting rod 5 is provided at one end with an enlargement 7 in which a transverse bore or opening 9 is provided. In the preferred embodiment illustrated the transverse bore 9 is arch-shaped having a straight base, straight walls and a half round top. It will be apparent to those skilled in the art that openings of other shapes may be used. In the form shown a pin 10 which may be a crank pin, occupies the central portion of the bore 9. It is encircled by two bearing members 11 and 13, each bearing member presenting a semi-circular bearing surface for the pin. The bearing member 11 is fitted to the half round section of the bore and on the bearing member 13 are opposed flat surfaces of unequal length which slidably fit the walls of the opening 9. The base of the member 13 is angularly disposed to the base of the opening 9 for a purpose which will be hereafter explained.

Near the base of the bore 9 are bores 18 and 20 through the enlargement 7. Passing freely through these bores is a threaded bolt 17 having a head 19 and provided with a locking nut 21. In the lower part of the opening 9 is a wedge-shaped member 15 having a threaded bore 16 therethrough in alignment with the bores 18 and 20. The bore 16 engages the threads of the screw 17 so that rotation of the bolt 17 and the nut 21 will cause movement of the tapered element 15. One side of the tapered element 15 engages the slanting base of the bearing member 13 and the other side bears against the base of the opening 9 so that movement of the wedge 15 actuated by rotation of the bolt 17 will force the bearing member 13 tightly into contact with the pin 10.

Parallel to the side walls of the bore 9 and passing through the base of the enlargement 7 are two bores 33 one on each side of the opening 9. In alignment with these bores are threaded bores 26 in the bearing member 13 through which screw bolts 27 are threaded. These bolts 27 pass freely through the bores 33 and may be rotated by means of their heads 29 and may be locked in position by the lock nuts 31.

Recesses 23 are provided in the bearing member 13 and in the preferred embodiment these recesses take the form of L-shaped mortises in the opposed outer sides of the bearing and which communicate with the bores 26. Fitted in these mortises and imprisoned by the walls of the bore 9 are L-shaped spacing elements 25 of incompressible material. The foot of the L of elements 25 is smaller than the corresponding part of the recess 23 so that they are permitted a limited movement back and forth longitudinally in the recesses 23 under the influence of the threaded bolts 27.

One end of these spacing members 25 is adapted to bear against the ends of the bearing member 11 and to hold it firmly in place in the bore 9. After the bearing element 11 is firmly seated, further pressure on the spacing element 25 by the bolt 27 results in backing away the bearing member 13 as far as may be permitted by the wedge element 15. It will be seen therefore, that by adjustment of the wedge element 15 and the two spacing elements 25 a very delicate clearance between the pin 10 and the bearing surfaces of the bearing elements 11 and 13 may be accomplished.

An advantage of this construction is that after this adjustment has once been made, it need not be readjusted until wear has taken place in the bearing. The unit may be taken down without impairing the adjustment. If the nut 21 is backed off the bolt 20 this bolt then becomes free with respect to the enlargement 7 and may be moved outwardly thereby releasing the pressure of the wedge 15 against the base of the bearing 13. As the bolts 27 are free to pass through the bores 33 this bearing together with the spacing members 25 may be loosened. Unless the bolts 27 or the locking nuts 31 are turned during this operation the adjustment of the parts will be undisturbed and in reassembling it is sufficient simply to tighten up on the nut 21 and the entire assembly will be brought back into adjustment.

In the event that the freedom given by merely loosening the wedge member 15 is insufficient, the bolt 17 may be completely removed and the wedge member 15 may be taken from the assembly. Under these circumstances the bearing 13 and its attached parts may be moved sufficiently to the right to permit the bearing 11 being rotated around the pin 10 to a position where it may be easily removed from the bore 9. Upon replacement, the entire assembly may be readjusted simply by tightening up on the wedge 15 through manipulation of the bolts 17 and the nut 21. When this wedge is tightened to the utmost, the assembly will once more be in the same adjustment as before dismantling.

After slight wear has taken place in the bearings, sufficient to make a readjustment advisable, and without at the same time requiring replacement or scraping of the bearings themselves, they may be tightened by simply backing off the bolts 27 a fraction of a turn and taking up the slack by movement of the wedge 15. It will be apparent to those skilled in the art that many modifications of this construction are possible without departing from the spirit of the invention.

I claim:

1. A connecting rod having a bore, a pair of bearing members in the bore to encircle a pin, means to force the bearing members into contact with the pin, spacing elements slidable on opposed side surfaces of one bearing member and seating against only the other bearing member, and means in the bore acting against the spacing elements to actuate the spacing elements longitudinally of the rod for separating the bearing members and thereby fix a clearance between the bearing members and the pin.

2. A connecting rod having a bore, a pair of bearing members in the bore to encircle a pin, means to force the bearing members into contact with the pin, spacing elements slidable on opposed side surfaces of one bearing member and seating against only the other bearing member, and means in the bore comprising a threaded member threadedly engaging one bearing member and acting against the spacing elements to actuate the spacing elements longitudinally of the rod for separating the bearing members and thereby fix the clearance between the bearing members and the pin.

3. A connecting rod having a bore, a pair of bearing members in the bore to encircle a pin, means to force the bearing members into contact with the pin, spacing elements located in recesses in opposed side surfaces of one bearing member and seating against only the other bearing member, and screw means in the bore threaded in the recessed bearing member for actuating the spacing elements longitudinally of the rod to withdraw one bearing member from the other and thereby fix the clearance between the bearing members and the pin.

4. A connecting rod having a bore, a pair of bearing members in the bore to encircle a pin, means to force the bearing members into contact with the pin, spacing elements slidable in the opposite ends of one bearing member and seating against only the other bearing member, and screw means freely extending through the bore but threaded in the recessed bearing member for actuating the spacing elements longitudinally of the rod to withdraw one bearing member from the other and thereby fix the clearance between the bearing members and the pin.

5. A connecting rod having a bore, a pair of bearing members in the bore each having a half round concave bearing surface to engage approximately half the surface of a round pin, recesses in the opposed side surfaces of one bearing member, a slidable spacing element in each recess bearing against only the opposite bearing member, means to force the bearing members into contact with the pin, and means in the bore engaging the spacing elements and one bearing member and being movable longitudinally of the rod to force the bearing members apart to fix the desired clearance between the bearing surfaces and the pin.

6. A connecting rod having a bore, a pair of bearing members in the bore each having a half round concave bearing surface to engage approximately half the surface of a round pin, a recess in each end surface of one bearing member, a slidable spacing element in each recess bearing against only the opposite bearing member, means to force the bearing members into contact with a pin, and screw means in the bore engaging the spacing elements and one bearing member and being movable longitudinally of the rod to force the bearing members apart to fix the desired clearance between the bearing surfaces and a pin.

7. A connecting rod having a bore, a pair of bearing members therein to encircle a pin, a wedge member to force the bearing members into contact with the pin, and bolt members freely rotatable in the rod and in threaded engagement with one bearing member adapted to exert a thrust parallel with the axis of the rod upon the other bearing member to adjust the clearance between the bearing members and the pin.

JOHN LE VALLEY.